US011328351B2

(12) United States Patent
Sarir et al.

(10) Patent No.: US 11,328,351 B2
(45) Date of Patent: May 10, 2022

(54) APPARATUS AND METHOD TO SECURELY INSTRUCT AN ORDER BY EFFICIENTLY INVOKING A PROGRAM APPLICATION ON A COMPUTING DEVICE

(71) Applicant: THE TORONTO-DOMINION BANK, Toronto (CA)

(72) Inventors: Nasim Sarir, Thornhill (CA); Peter Horvath, Toronto (CA); Maryam Karbasi, Toronto (CA)

(73) Assignee: THE TORONTO-DOMINION BANK, Toronto (CA)

( * ) Notice: Subject to any disclaimer, the term of this patent is extended or adjusted under 35 U.S.C. 154(b) by 13 days.

(21) Appl. No.: 16/144,106

(22) Filed: Sep. 27, 2018

(65) Prior Publication Data
US 2019/0095990 A1 Mar. 28, 2019

Related U.S. Application Data

(60) Provisional application No. 62/563,774, filed on Sep. 27, 2017.

(51) Int. Cl.
*G06Q 40/02* (2012.01)
*G06Q 20/32* (2012.01)
*G06F 21/32* (2013.01)
*G06F 21/31* (2013.01)

(52) U.S. Cl.
CPC ............ *G06Q 40/02* (2013.01); *G06F 21/31* (2013.01); *G06F 21/32* (2013.01); *G06Q 20/3221* (2013.01); *G06Q 20/3223* (2013.01)

(58) Field of Classification Search
CPC ...................................................... G06Q 40/02
See application file for complete search history.

(56) References Cited

U.S. PATENT DOCUMENTS

| | | | |
|---|---|---|---|
| 6,658,522 B1* | 12/2003 | Martin | G06F 12/126 710/6 |
| 9,639,888 B2* | 5/2017 | Proulx | G06Q 20/14 |
| 10,157,420 B2* | 12/2018 | Narayana | G06Q 20/202 |
| 10,250,733 B1* | 4/2019 | Gordon | G06Q 30/0261 |
| 2010/0268629 A1* | 10/2010 | Ross | G06Q 10/10 705/35 |
| 2011/0208629 A1* | 8/2011 | Benefield | G06Q 40/02 705/35 |
| 2012/0296768 A1* | 11/2012 | Fremont-Smith | G06Q 40/02 705/26.8 |
| 2013/0198064 A1* | 8/2013 | Sobut | G06Q 40/02 705/39 |
| 2016/0267601 A1* | 9/2016 | Kundu | G06Q 40/02 |

(Continued)

*Primary Examiner* — Namrata Boveja
*Assistant Examiner* — William D Newlon

(57) ABSTRACT

There is a provided an apparatus and method to securely communicate an order by efficiently invoking a program application on a computing device. The computing device may operate to receive and present a push notification, even while in a locked state, where the push notification requests input to initiate a performance of a task that is associated with an application defined by instructions stored on the computing device. The computing device receives input and initiates the performance of the task without fully loading the application into an operating memory. The input may initiate a communication of a message to a remote processing system to execute the order.

20 Claims, 11 Drawing Sheets

(56) References Cited

U.S. PATENT DOCUMENTS

| | | | | |
|---|---|---|---|---|
| 2017/0193484 A1* | 7/2017 | Pitz | .................... | G06Q 20/405 |
| 2018/0359349 A1* | 12/2018 | Graylin | ............... | G10L 15/1815 |
| 2019/0272593 A1* | 9/2019 | Sokol | .................... | G06Q 40/02 |

* cited by examiner

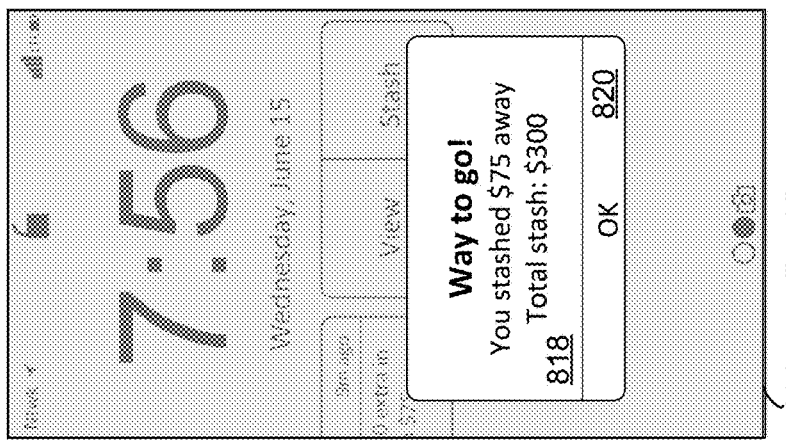
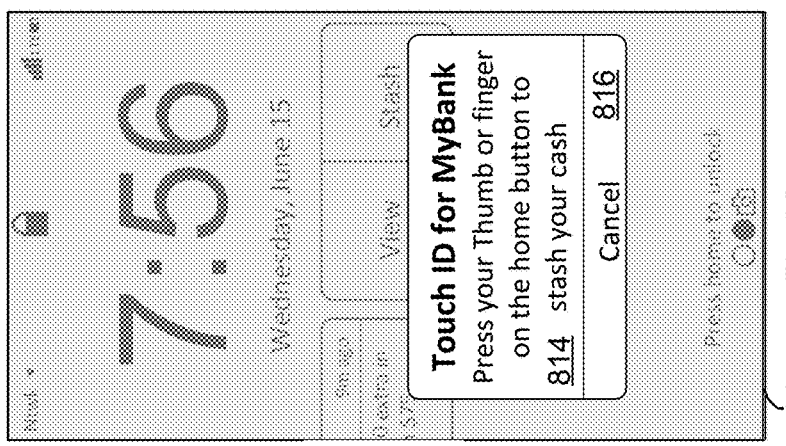
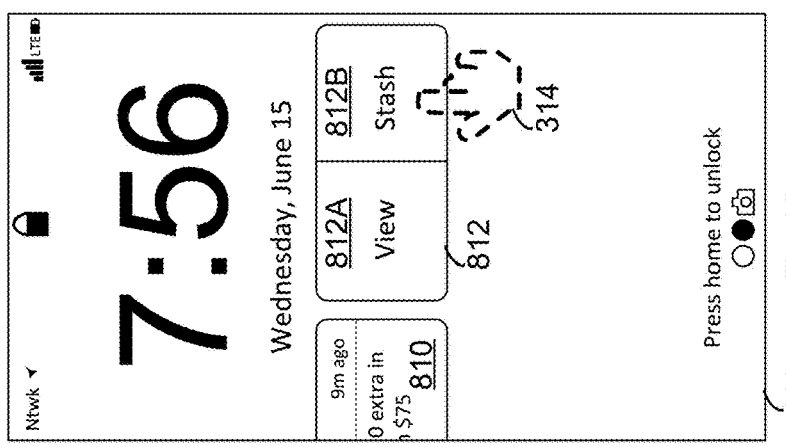
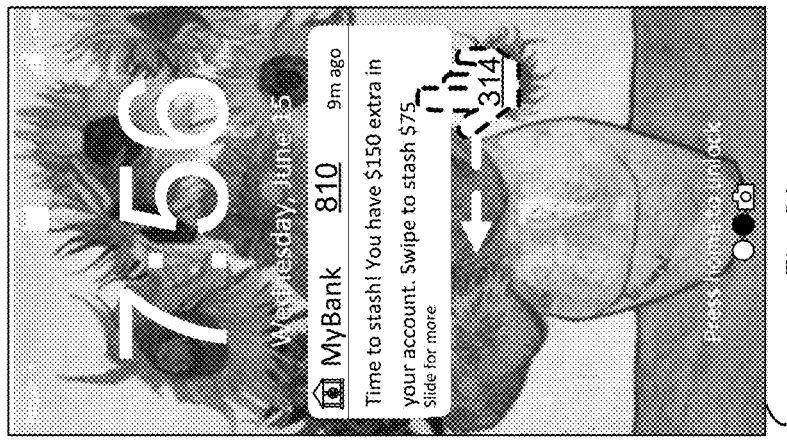

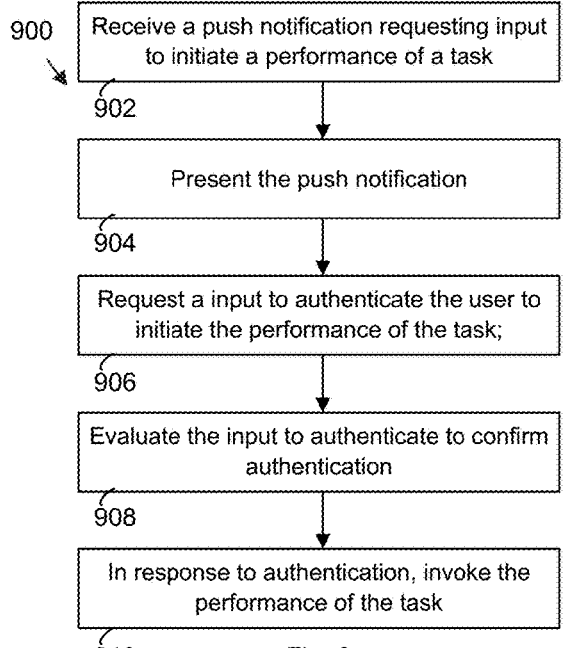
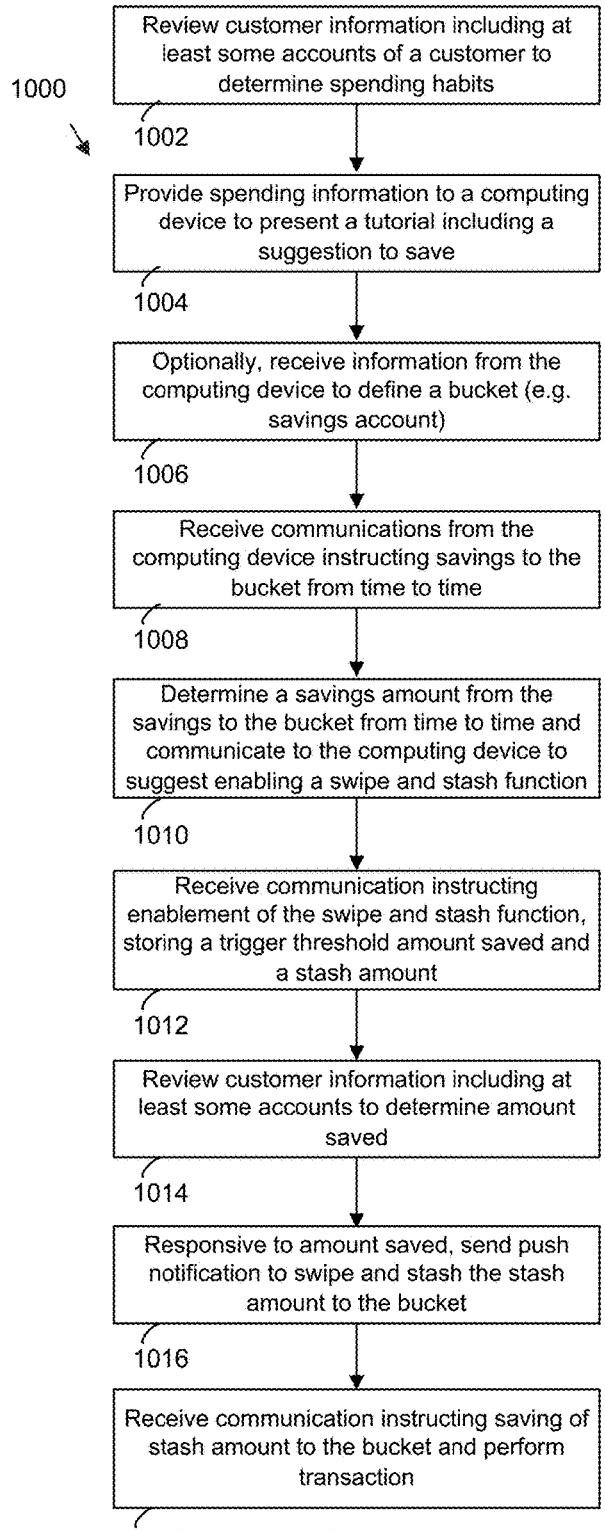

ously computing devices and remote processing systems in communication where a computing device is configured to securely instruct an order with the remote processing system by partially operating an application program that is stored on the computing device.

APPARATUS AND METHOD TO SECURELY INSTRUCT AN ORDER BY EFFICIENTLY INVOKING A PROGRAM APPLICATION ON A COMPUTING DEVICE

CROSS REFERENCE

The present application claims the benefit of U.S. provisional application No. 62/563,744 filed Sep. 27, 2017, the contents of which are incorporated herein by reference.

FIELD

The present disclosure relates to computer systems, particularly computing devices and remote processing systems in communication where a computing device is configured to securely instruct an order with the remote processing system by partially operating an application program that is stored on the computing device.

BACKGROUND

User computing devices, particularly mobile communication devices, may be enabled via applications to communicate with remote processing systems, for example, to instruct an order for processing by the remote processing system. Instructing an order requires the user to control the user computing device to perform the desired operations. Controlling the computing device requires the device to be in an unlocked state and a corresponding application for the desired operations be fully running on the computing device. That may take an unnecessary amount of processing resource of the computing device and the user's time for certain tasks.

SUMMARY

There is a provided apparatus and method to securely communicate an order by efficiently invoking a program application on a computing device. The computing device may operate to receive and present a push notification, even while in the locked state, where the push notification requests input to initiate a performance of a task that is associated with an application defined by instructions stored on the computing device. The computing device receives input and initiates the performance of the task without fully loading the application into an operating memory. The input may initiate a communication of a message to a remote processing system to execute the order.

There is provided a computing device comprising a processor and, coupled to the processor, a storage device, a communication subsystem, an input device and an output device, the storage device storing instructions which when executed by the processor configure the computing device to: receive, via the communication subsystem, a push notification requesting input to initiate a performance of a task that is associated with an application defined by instructions stored on the computing device; present the push notification; and initiate the performance of the task without fully loading the application into the operating memory.

The push notification may be received when the computing device is in a locked state, where control of the computing device is restricted until the computing device receives authentication to transition to an unlocked state. As such, the computing device may be configured to receive and authenticate an authentication input; and, in response, transition to the unlocked state.

To initiate the performance of the task may comprise loading into an operating memory only a portion of the application without loading a remainder of the application. The application may include a financial application having access to one or more financial accounts of a user of the computing device and the task includes sending a message, via the communication subsystem, to instruct an execution of a financial transaction by a remote financial system in relation to at least one of the one or more financial accounts. The financial transaction may include a savings transaction and the push notification may be generated from a review of at least some of the one or more financial accounts to determine an amount available for the financial transaction.

The instructions of the application may configure the computing device to provide a transaction suggestion component operating to: present one or more GUIs defining a suggestion to perform a first financial transaction, the first financial transaction determined from a review of at least some of the one or more financial accounts to determine an amount available for the first financial transaction; and send a communication, via the communication subsystem, to perform the execution of the first financial transaction by a remote financial system in response to input received.

The instructions of the application may configure the computing device to provide a savings teaching tool component operating to: present one or more GUIs to teach recent spending habits determined from a review of at least some of the one or more financial accounts to track recent spending; and present one or more GUIs to teach an opportunity to save on spending.

The transaction suggestion component may further operate to define a new financial account at the remote financial system with which to perform the first financial transaction. The first financial transaction may include a savings deposit and the new financial account include a savings account.

The transaction suggestion component may further operate to: present one or more GUIs to define a pre-set amount for performing financial transactions periodically, where the one or more GUIs show a quantum of savings regularly achieved from which to define the pre-set amount and the quantum of savings is determined from tracking spending habits over a tracking period; define the pre-set amount in response to received input for the pre-set amount; and, communicate, via the communication subsystem, the pre-set amount to the remote financial system to periodically define and communicate instances of the push notification to the computing device to perform instances of the financial transaction periodically.

There is provided a computing device comprising a processor and, coupled to the processor, a storage device, a communication subsystem, an input device and an output device, the storage device storing instructions which when executed by the processor configure the computing device to: receive and present a push notification while in a locked state, the push notification requiring authenticated authorization to perform an order; receive and authenticate an authorization to perform the order; and load into an operating memory only a portion of an application to instruct a performance of the order without loading a remainder of the application.

These and other aspects will be apparent to those of ordinary skill in the art.

BRIEF DESCRIPTION OF THE DRAWINGS

FIGS. 3A-3B, 4, 5A-5D, 6A-6B, 7A-7B and 8A-8D are illustrations of graphical user interfaces in accordance with an aspect of the present disclosure.

FIGS. 9 and 10 are flowcharts of operations of computing devices in accordance with aspects of the present disclosure.

DETAILED DESCRIPTION

Figure 1:
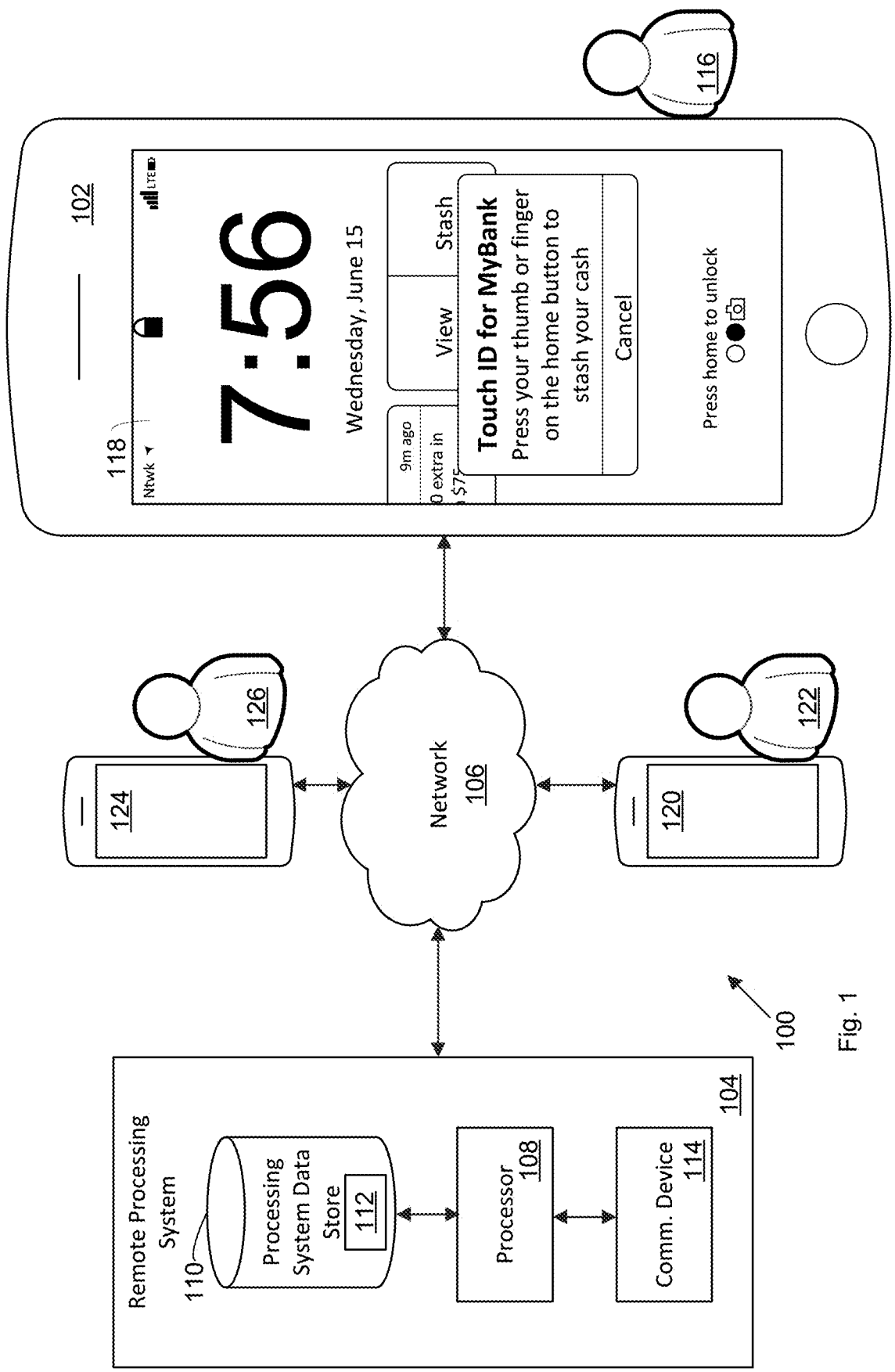
FIG. 1 is a block diagram of a computer network including user computing devices and a remote processing system in accordance with an aspect of the present disclosure.

FIG. 1 is a diagram illustrating an example computer network 100 in which a first computing device 102 is configured to communicate with a remote processing system 104 via a communication network 106 to instruct orders for processing. Remote processing system is simplified but comprises a processor 108, a processing system data store 110 and communication device 114 with which to communicate. Processing system data store 110 stores customer information and/or user information 112 such as for a user 116 of computing device 102. Computing device 102 is described in further detail with respect to FIG. 2 but comprises a gestural I/O device for receiving input and displaying output in the form of graphical user interfaces (GUIs) to control computing device 102. Additional computing devices include second computing device 120 for use/control by a second user 122 and a third computing device 124 for use/control by a third user 126. Second user 122 may also be a customer relative to remote processing system 104. Remote processing system 104 may be a remote financial processing system operated by or on behalf of a financial institution such as a bank. Remote processing system may manage accounts for customers such as users 116 and 122. User 126 as described later is not a customer of the financial institution.

As described further, apparatus and methods are described for generating impulse savings which enable the computing device 102 to instruct an order (a savings transaction) for processing by remote processing system 104. Certain orders may be initiated in response to a push notification sent by remote processing system 104 to the computing device 102. The push notification may be received when the computing device 102 is in a locked state where control is limited. The computing device 102 may be configured to present the order while remaining in a locked stated, authenticating the order to swipe and stash simultaneously with or after opening/unlocking the computing device. Further features will be apparent to those of ordinary skill in the art. Remote processing system 104 may be enabled to review customer information (at least some of the accounts) to determine spending habits and teach saving opportunities and make saving recommendations. New saving accounts (a bucket to receive a saving stash) may be opened. Further review of spending and saving habits may trigger a suggestion to enable a swipe and stash function to securely instruct a saving order without fully loading an associated application. A review of other customer information such as calendar, contact, communication and/or social media information may discover savings events where saving targets may be established and tracked. A new bucket may be opened. Others may be invited to participate in the savings stashing amounts to the new bucket. Participants may be notified of activities by other participants. Permissions may be established for the different participants to limit or enable certain activities. A bucket may be a subaccount associated with a parent account managed by the remote processing system participants may be customers of the remote processing system or third parties (non-customers).

In the example of FIG. 1, any of the computing devices 102, 120 and 124 may be a mobile phone. Other examples of such computing devices may be a tablet computer, a personal digital assistant (PDA), a laptop computer, a tabletop computer, a portable gaming device, a portable media player, an e-book reader, a watch, or another type of computing device having an ability to communicate with remote processing system 104 as well as other features as will be apparent herein. Though described further the computing devices herein have at least one processing device (e.g. a processor, etc.) and memory (e.g. a storage device, etc.) storing instructions which when executed by the processing device configure the computing device to perform operations.

Communication network 106 which may comprise a wide area network (WAN) such as the Internet. It is understood that communication network 106 is simplified for illustrative purposes. Communication network 106 may comprise additional networks coupled to the WAN such as a wireless network and/or local area network (LAN) (not shown) between the WAN and any of the computing devices.

Although the present disclosure illustrates and discusses a gesture-based I/O device 118 primarily in the form of a screen device with IO capabilities (e.g. touchscreen), other examples of gesture-based I/O devices may be utilized which may detect movement and which may not comprise a screen per se. Computing device 102 may receive gesture-based input from a track pad/touch pad, one or more cameras, or another presence or gesture sensitive input device, where presence means presence aspects of a user including for example motion of all or part of the user.

Computing device 102 may generate output for display on a screen of gesture-based I/O device 118 or in some examples, for display by a projector, monitor or other display device. It will be understood that gesture-based I/O device 118 may be configured using a variety of technologies (e.g. in relation to input capabilities: resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology; and in relation to output capabilities: a liquid crystal display (LCD), light emitting diode (LED) display, organic light-emitting diode (OLED) display, dot matrix display, e-ink, or similar monochrome or color display).

In the examples described herein, gesture-based I/O device 118 includes a touchscreen device capable of receiving as input tactile interaction or gestures from a user interacting with the touchscreen. Such gestures may include tap gestures, dragging or swiping gestures, flicking gestures, pausing gestures (e.g. where a user touches a same location of the screen for at least a threshold period of time) where the user touches or points to one or more locations of gesture-based I/O device 118. Gesture-based I/O device 118 and may also include non-tap gestures. Gesture-based I/O device 118 may output or display information, such as Graphical user interface, to a user. The gesture-based I/O device 118 may present various applications, functions and capabilities of the computing device 102 including, for example, messaging applications, telephone communications, contact and calendar applications, Web browsing applications, game applications, e-book applications and financial, payment and other applications or functions among others.

Figure 2:
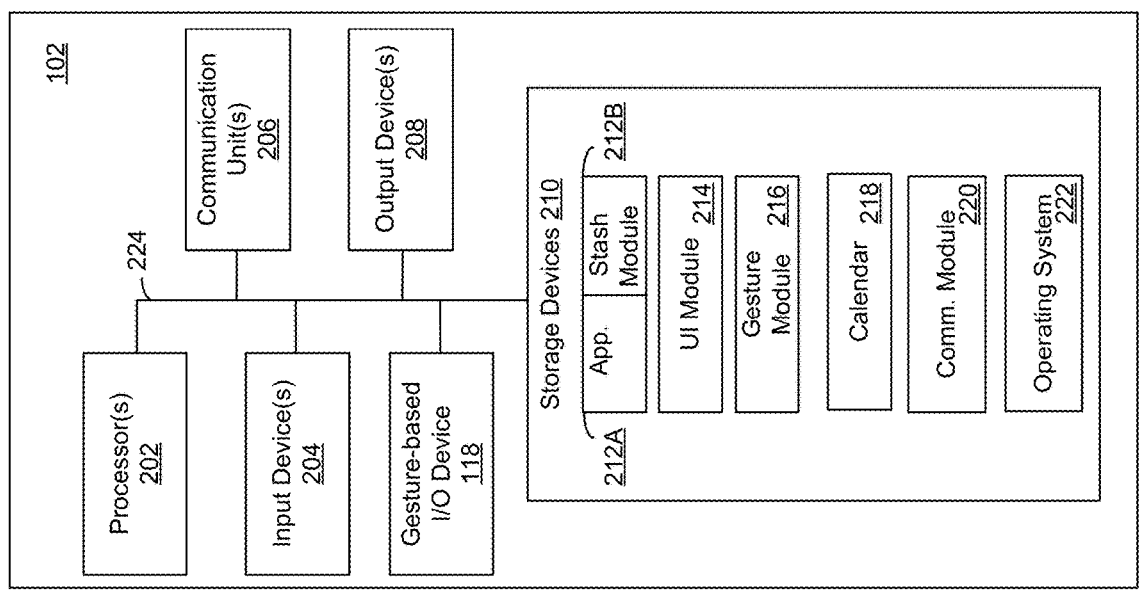
FIG. 2 is a block diagram illustrating an example (user) computing device, in accordance with one or more aspects of the present disclosure.

FIG. 2 is a diagram illustrating in block form an example computing device (e.g. computing device 102), in accordance with one or more aspects of the present disclosure. The computing device may be configured as a user device, for example, to request order processing. Computing device 102 comprises one or more processors 202, one or more input devices 204, gesture-based I/O device 118, one or more communication units 206 and one or more output devices 208. Computing device 102 also includes one or more storage devices 210 storing one or more modules (e.g. software components) such as an application 212A having a stash module 212B, UI module 214, gesture module 216, calendar 218, communication module 220 and operating system 222. Communication channels 224 may couple each of the components 202, 204, 206, 208, 210, 212, 214, 216, 218, 220 and 222 for inter-component communications, whether communicatively, physically and/or operatively. In some examples, communication channels 224 may include a system bus, a network connection, an inter-process communication data structure, or any other method for communicating data. Stash module 212B may be separately loadable into an operating memory or working memory of instructions currently being used (e.g. random access memory (RAM), etc. as described below) for executing by the one or more processors 202 to execute a stash function associated with application 212A. Thus a portion (e.g. stash module 212B) of the whole application (an aggregation of application 212A and stash module 212B) may be loaded without loading in a remaining portion (e.g. application 212A) of the whole application to perform the task. The remaining portion of the whole application may be referenced as "a remainder of the application" for convenience.

One or more processors 202 may implement functionality and/or execute instructions within computing device 102. For example, processors 202 may be configured to receive instructions and/or data from storage devices 210 to execute the functionality of the modules shown in FIG. 2, among others (e.g. communication applications, browser, games, etc.) Computing device 102 may store data/information to storage devices 210. Some of the functionality is described further herein below.

One or more communication units 206 may communicate with external devices (e.g. of remote processing system 104, via one or more networks (e.g. communication network 106) by transmitting and/or receiving network signals on the one or more networks. The communication units may include various antennae and/or network interface cards, chips (e.g. Global Positioning Satellite (GPS)), etc. for wireless and/or wired communications.

Input and output devices may include any of one or more buttons, switches, pointing devices, cameras, a keyboard, a microphone, one or more sensors (e.g. biometric, etc.), a speaker, a bell, one or more lights, etc. One or more of same may be coupled via a universal serial bus (USB) or other communication channel (e.g. 224).

The one or more storage devices 210 may store instructions and/or data for processing during operation of computing device 102. The one or more storage devices may take different forms and/or configurations, for example, as short-term memory or long-term memory. Storage devices 210 may be configured for short-term storage of information as volatile memory, which does not retain stored contents when power is removed. Volatile memory examples include random access memory (RAM), dynamic random access memory (DRAM), static random access memory (SRAM), etc. Storage devices 210, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable memory (EPROM) or electrically erasable and programmable (EEPROM) memory.

Application 212A and stash module 212B (whether native or browser-based) and may be configured to obtain input to perform an action such as to communicate with remote processing system 104, display data therefrom, input data, etc. Application 212A may be a banking application in relation to user accounts managed by the remote processing system 104. Application 212A and stash module 212B may cooperate with UI module 214 and gesture module 216 to present a user interface and receive gesture input via gesture-based I/O device 118. Certain information to present in the user interface may be obtained from remote processing system 104 for example, looking up data stored on behalf of user 116. Certain information (data) may be received electronically via communication unit(s) 206.

Gesture module 216 may receive input from gesture-based I/O device 118 entered via the touchscreen, processing same for communication with application 212A, stash module 212B and/or UI module 214 and/or others. In some configurations, gesture module 216 may be a component of operating system 222. In response to input detected by gesture-based I/O device 118, gesture module 216 may receive information for processing. The information may be aggregated or grouped to generate one or more touch or gesture events. The events may include data representing a location on gesture-based I/O device 118 where the input is received, a time when the input or part thereof is received at the location, and/or a direction component (e.g. push down, pull up, lateral motion). The touch events may be communicated to UI module 214 and/or application 212A and/or operating system 222 for further processing.

UI module 214, application 212A, stash module 212B and/or operating system 222 may use the data associated with the one or more touch events to determine a response. In one example, the touch events are received when the device is in a locked state and a response may be to authenticate a user to unlock computing device 102 and only bring up (i.e. load into operating memory) stash module 212B rather than all of the application to communicate a message to remote processing system to complete a savings order. Application 212A with all of its functions and capabilities need not be read into memory, etc. to achieve the stash message function. Operating system 222 may be configured to lock and unlock the device (changes states) in response to authentication using one or more authentication methods as described.

Computing device 102 may be configured to communicate such as via email or short message service (SMS or Text message) via one or more modules not shown.

It is understood that operations may not fall exactly within the modules 212A-222 or those not shown of FIG. 2 such that one module may assist with the functionality of another.

FIGS. 3A-3B, 4, 5A-5D, 6A-6B, 7A-7B and 8A-8D are graphical user interfaces (GUIs) illustrating a scenario of impulse savings in accordance with an aspect of the present disclosure. The scenario culminates at FIGS. 8A-8D in a swipe and stash interaction whereby a user may be prompted to instruct the initiation of the performance of an order (e.g.

a savings transaction) and authenticate the instruction without bringing up the entire application 212A.

Unlocking performs a number of functions to bring the computer device up and that by invoking a payment instruction (task) following authentication but without launching the full banking application saves processing resources, etc. Also, authenticating for just a single one action—sending the message to perform the transaction without bringing up the full banking application—keeps the device secure such that no other actions can be taken e.g. by mistake or should user forget to lock device.

Figure 3B:
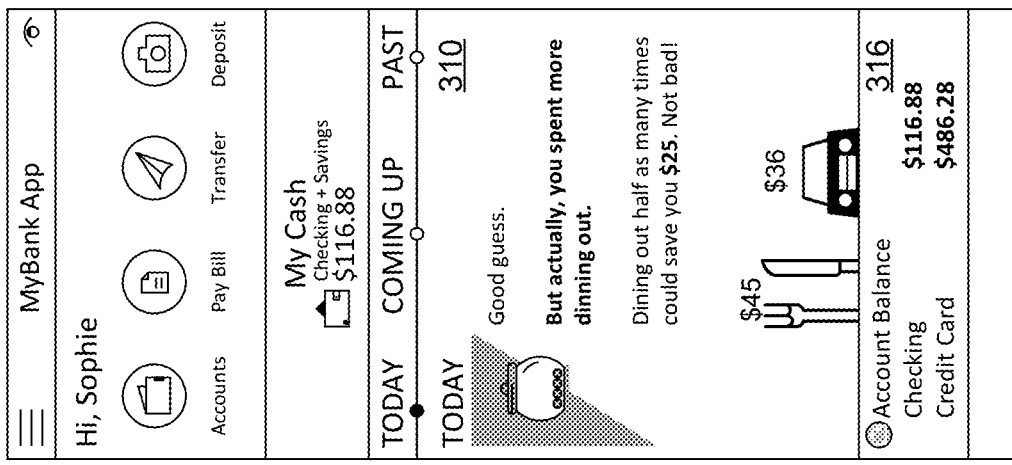
Figure 3A:
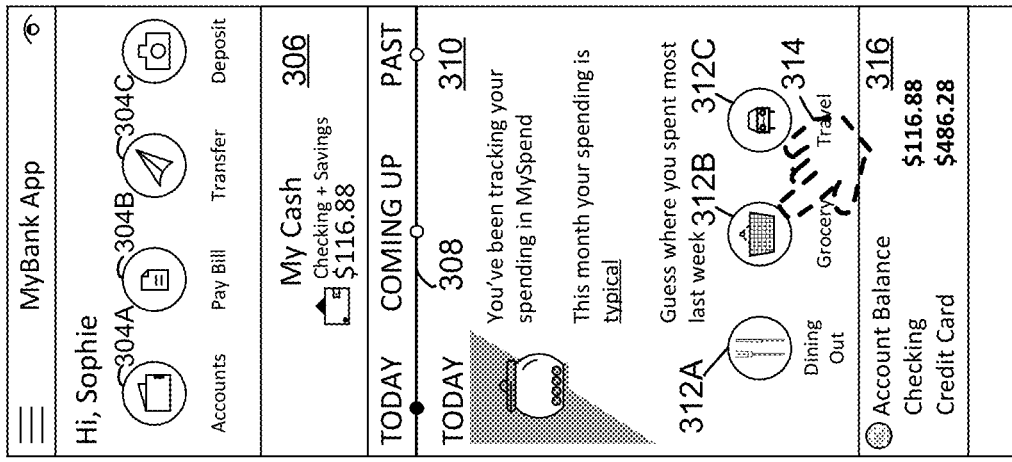

FIGS. 3A and 3B are GUIs 300 and 302 from application 212A (e.g. "MyBank App") executing on computing device 102 to provide mobile banking functionality. The GUIs are scrollable up and down the display device. GUIs 300 and 302 illustrate more information than may fit within a display screen such as gesture-based I/O device 118 of computing device 102 at one time (and are not screen shots per se). The GUIs thus extend vertically beyond the dimensions of the display screen.

Various icons are associated with respective controls to invoke various features such as account review (accounts 304A), paying bills (pay bill 304B), transferring between accounts (transfer 306C) etc. The GUI may be scrolled further to the right to reveal additional controls (not shown). A portion 306 of the GUI may provide a summary display of account related information which may be standard banking related accounts such as checking and/or savings accounts, etc. or (as shown later) investment accounts. Portion 306 may have associated controls to advance to related screens for such information (not shown).

A timeline control 308 receives input to present information and/or functions for current, future or past banking related events in portion 310. Portion 310 shows information for a current day ("today"). In the present instance, portion 310 comprises information to teach spending habits, such as in the form of a tutorial extending over a time period. The spending habits are determined, at least in part, by a review of at least some of the user's account information over a time period. The time period may extend to a number of months and various GUIs presented on particular days to report spending habits that provide teachable moments to the user.

Application 212A is in communication with remote processing system 104 that stores account and other information for the user. Such may be referred to as user information or customer information. The customer (user 116) has enabled the remote processing system permission to review the account information (not shown). This information may comprise credit card, savings, checking and other account information. The information may be generated by the remote processing system such as from transactions it performs or data it receives from or on behalf of the user and/or it may be obtained from a third party system (not shown) such as from a third party credit card provider.

The account information shows amounts spent at and/or transferred to various individuals, businesses, institutions, government and other entities. The information may be classified into categories (travel, home, auto, grocery, dining, entertainment, education, medical, dental, other, etc.). More granular tracking may be performed. Entertainment may break down to books, music, performance attendance (e.g. concerts, live theatre, dance, cinema/films, professional sports, etc.). Personal and business related spending may be distinguished.

Specific spending may be tagged to a category automatically such as by classifying the receiving entity to a category. A customer may also assist to identify a category and/or correct an automatic tagging. For example, a particular spend to an automotive related entity may be an auto expense or may be a gift requiring user disambiguation (all not shown).

Trends in spending may be determined such as average spends in a category over a period of time such as a week, a month, a weekend, a year, etc. Various reports, in text or graphs, etc. may be generated and provided such as via one or more screens of a GUI or other means (email, SMS, printed report, etc.) By way of example, weekly and monthly trends may be determined and reported. Spends to two or more related categories may be aggregated—e.g. dining out, travel and entertainment may be aggregated to discretionary spending.

GUI 300 introduces a spending tutorial showing that the present month's spending is "typical" such as may be determined by a comparison against historical spending amounts across common categories. The tutorial includes a quiz, asking the user to guess where the most money was spent. Quiz input controls 312A, 321B and 312C with associated icons are provided to receive the user's guess via a tap input as illustrated by hand 314 in dotted lines. Hand 314 is for illustration purposes and would not appear in the GUI.

GUI 300 further includes account balance information in portion 316. Though not shown, the account names may have associated controls which, if invoked, switch to a GUI showing detailed information for the account including transactions, for example.

GUI 302 shows portion 310 updated for the guess as input via control 312B. The guess was incorrect, and GUI 302 shows the correct information and comparison information. Portion 310 also includes a suggestion regarding spending habits, for example, to reduce discretionary spending on dining activities.

Figure 4:
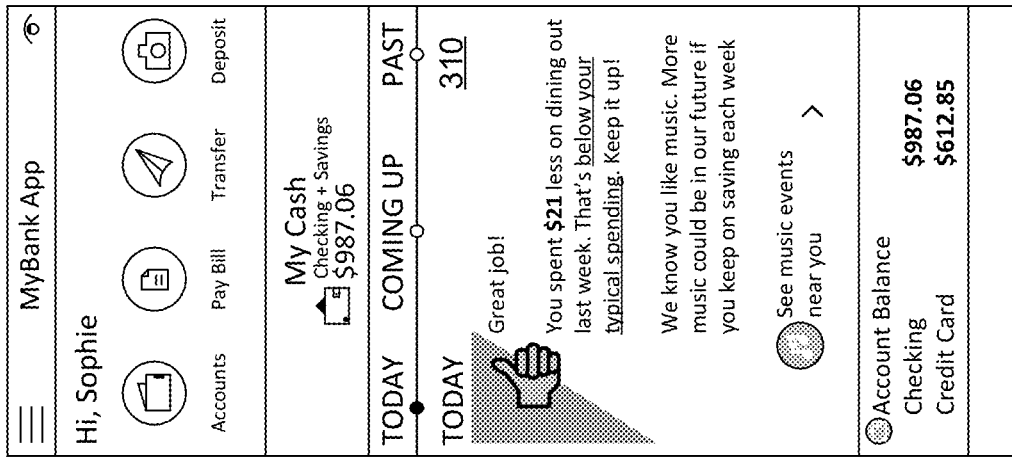

Spending monitoring is on-going during the time period. FIG. 4 shows GUI 400 after a period of time relative to GUI 302. In the present instance the period is one week. In portion 310 the tutorial continues relative to the current day (today). A message of encouragement and reinforcement is presented. A continued review of the at least some of the accounts shows dining spending is down $21, which is below typical. The idea of saving is linked to a spending habit of the user—music. The habit may be determined from reviewing the account information as described.

GUI templates and review rules may be used to present the tutorial. Rules may be used (e.g. by remote processing system 104) to review the spending information to generate conclusions about habits, saving opportunities, etc. The conclusions may be used to select from appropriate templates to generate the portion 310 of the GUIs, including quiz input controls 312A, 31B and 312C, etc. For example, a rule may be defined where if the user's checking account amount is growing (is larger by a threshold amount than during a previous period or larger than an average amount over a number of periods) after accounting for regular expenses, a saving opportunity may exist. A rule may be defined to compare spending in certain types of discretionary (or other categories) and if a difference is over a threshold amount, whether above or below, the fact may trigger an appropriate reporting GUI defined by a template.

FIGS. 5A-5D show GUIs 500, 502, 504 and 506 with information and controls to suggest a saving opportunity and to define a saving "bucket". Spending monitoring is on-going as stated and GUI 500 may be presented sometime after GUI 400, triggered by the review of events in the spending. The period may be a month, for example. A trigger may be a determination that a set amount has been saved since the tutorial began, for example. Portion 310 shows information indicating that $126 was saved over the period. An average balance of the checking account may have increased by this amount for a period of time show a sustained saving, for example. The tutorial suggests a saving opportunity and control 510 is presented to receive input to begin defining saving transaction.

In FIG. 5B, GUI 502 shows portion 310 suggesting a specific saving amount ($75) and presenting a control 512 ("create a bucket", to invoke a GUI to create an account providing a destination to save the amount. A second control 514 in portion 310 is presented to receive input to invoke a screen or GUI element (e.g. a pop-up, etc.) to define a different amount. The remote processing system 104 manages accounts for the customer (user 116) of computing device 102. Creating a bucket updates the records (customer data) of the remote processing system 104.

GUI 504 of FIG. 5C may be invoked from control 512 of GUI 502. A first portion 516 presents information about the features of the account to be created. A second portion 518 presents legal information regarding the agreement with a control 520 to learn more. A slider control 522 is presented to receive input indicating a third party will be associated with the account. The slider control 522 may determine which legal information is presented and how the account is set up in the remote processing system 104. Control 524 is presented to receive input to open the account on the terms provided (e.g. responsive to the position of the slider control 522, etc.) Control 524 invokes the communication of a message to the remote processing system 104 to open the account. Messaging between device 102 and remote processing system 104 is secure, for example, using known techniques. The remote processing system authenticates the message and performs the opening, responding to the application 212A with the results (e.g. account information for the new account). GUI 506 may be invoked in response to a reply from the remote processing system 104 that the bucket is opened. Portion 316 is updated with the new account with the label "Savings Stash".

In accordance with the embodiment shown and described a bucket is a subaccount of a parent savings account. This subaccount may be associated with a savings goal or a general saving desire. The subaccount may be associated with savings suggestions presented by the computing device in response to a review of the spending habits (i.e. a review of at least some account information). As the remote processing system may manage many accounts for its customer, it may be that a review of only the checking or the checking and credit card accounts is sufficient and other accounts need not be reviewed. Permissions or other legal terms related to the subaccount may differ from the parent account. It is understood that a bucket need not be a subaccount but could be a parent account.

FIG. 5D shows GUI 506, similar to GUI 504 but where portion 310 is updated to show that the bucket creation was successful and to provide a control 526 to view the account information. In the vernacular of the scenario, stash is the amount saved and bucket is the account (subaccount) where it is saved.

As noted, in portion 316, the account information is updated to reflect the new account and subaccount (i.e. the bucket "Savings Stash"). The savings are associated with a cloud icon indicating a general rainy day fund rather than a specific goal.

Figure 6B:
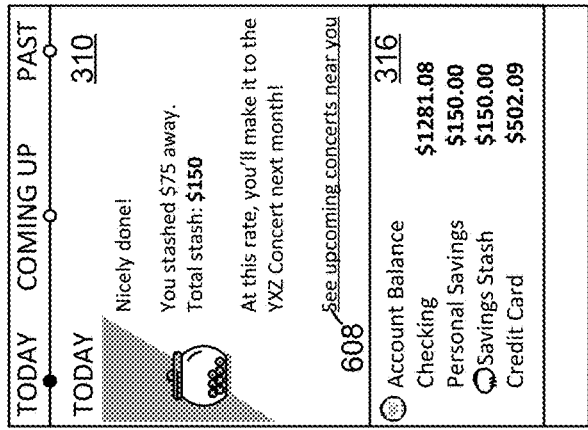
Figure 6A:
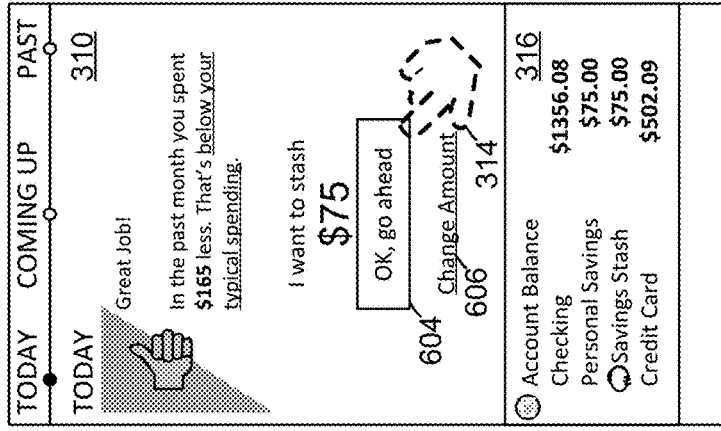

FIGS. 6A and 6B shows GUIs 600 and 602 continuing the tutorial and illustrating a tap and save instance. In these Figs. fewer portions of the full GUIs for application 212A are shown. These GUIs 600 and 602 include portion 310 and portion 316 of the GUIs shown earlier. GUI 600 shows output of the continuing spending review with the output information indicating lower spending ($165) than is typical was occasioned in the last period. The GUIs may be presented after two months since the beginning of the tutorial.

The review by remote processing system 104 reveals a savings opportunity. A savings suggestion with an amount ($75) is presented. Control 604 is presented to receive input to instruct the savings transaction with the remote processing system 104 via an appropriate message (message not shown). Control 606 is presented that may be invoked to bring up a GUI element to set a desired amount (not shown). GUI 602 in portion 310 confirms the successful stash (i.e. the successful execution of a savings transaction) and also shows, in portion 316, the updated amount in the savings stash and the amount debited from checking.

Figure 7B:
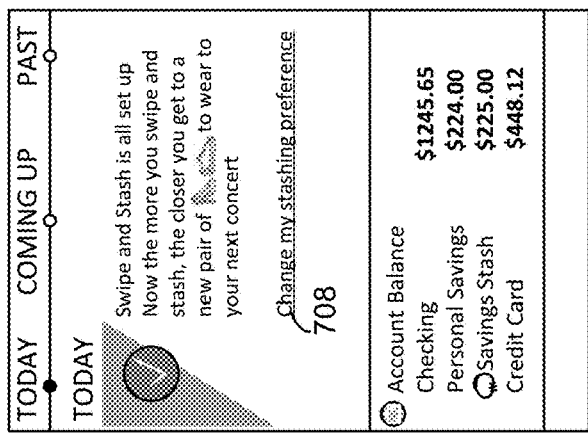
Figure 7A:
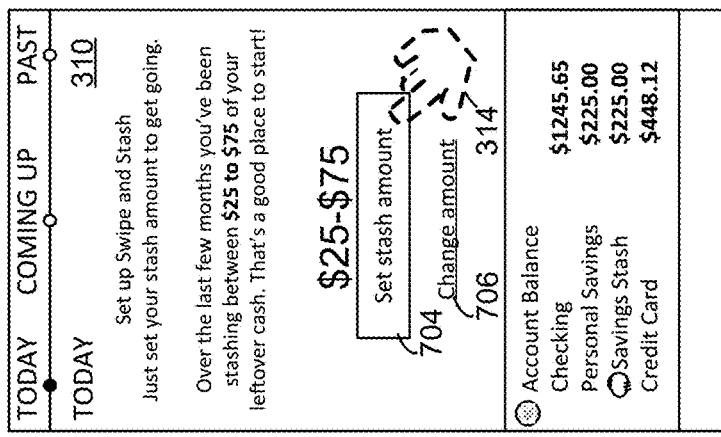

FIGS. 7A and 7B shows GUIs 700 and 702 continuing the tutorial and the setup of a swipe and save function. Following a review for a few months, it may be determined that the customer has changed spending habits and saved regularly (such as by regularly engaging in tap and save instances to stash various amounts to the bucket). A swipe and save function may be defined whereby a review of the spending may trigger a push notification to the computing device to prompt the user to instruct a savings (a type of order or transaction with remote processing system 104). In one manner, the push notification is displayed (e.g. on a lock screen) on the locked computing device. The user may instruct the savings by swiping the message on the screen of the computing device and authenticate to complete the instruction, after or simultaneously with unlocking the computing device.

GUI 700 shows portion 310 with information suggesting the enablement of the swipe and stash function. The spending review shows stashing activities in the range of $25 to $75 each. GUI 700 provides control 704 to turn on the function and set the stash amount for the swipe and stash. Control 706 provides a manner to establish a specific stash amount. GUI 702 shows the successful setup and provides a control 708 to view and/or change any stashing preference. Setup may communicate with remote processing device to enable the push notification triggered by a review of at least some of the accounts indicating the presence of the stash amount that may be stashed in a swipe and stash action. The remote processing system 104 may maintain preference information for the user regarding swipe and stash—e.g. that it is enabled, a threshold to trigger a notification to swipe and stash and the amount to be stashed.

FIGS. 8A-8C are screen shots of GUIs 800, 802, 804 and 806 showing a swipe and stash instance. The computing device is in a locked state where control of the computing device is limited until it transitions to an unlocked state. A user must authenticate to unlock the device. Various authentication schemes are known using user input including a PIN, password, gesture (e.g. a finger drawing), biometric data input (e.g. voice, thumb, finger, retinal image, facial image, etc.), etc.

Often computing devices have a lock screen where notifications pushed to the device or originated by the device may be displayed (presented). Because the device is locked, other than to clear the notification from the screen, to further engage with an application or other feature or function associated with the notification via the computing device, the computing device must be unlocked such as via an unlock interface. GUI 800 shows a lock screen with a representative background image. For greater clarity, GUIs 802, 804 and 806 omit the background image.

GUI 800 shows a push notification 810 in relation to an application defined by instructions stored on the computing device (e.g. stash module 212B associated to application 212A). Operating system 220 may be configured to enable push notifications for applications such as application 212A. Enablement may provide access (e.g. through an API, etc.) to display a push notification relative to an installed application. The push notification may be received in a communication from remote processing system 104 when the computing device 102 is in a locked state. The computing device presents the push notification—it may be displayed on a display device of the computing device 102. Though described and illustrated herein in a display context, the push notification may be presented in an audible manner. User input to invoke the stash function may be an audible command. The stash function may be performed by only loading a portion of the application—namely the stash module as described. Computing device 102 may have associated voice command capabilities (not shown).

The notification is a push notification as it is originated off of the device such as by remote processing system 104 having reviewed the spending, determined the stash amount is available from at least some account(s) having respective amounts alone or together that meet (or exceed) a triggering threshold amount. The push notification may indicate the stash amount to be saved. The notification also suggests that the user swipe the message to continue to save ("slide for more"). Swiping is shown by hand 314 tapping the display screen about the push notification 810 and moving along the screen in the direction of the arrow in dotted lines shown for illustration purposes only. The tap and sliding movement define a swipe gestural action to reveal control 812 shown in GUI 802. Control 812 has sub-controls 812A and 812B to, respectively, view the swipe message (812A) or stash (812B) to instruct the transaction). The stash control, after authentication, invokes the stash module 212B to send the message to the remote processing system 104 without having to invoke the entire application 212A.

Hand 314 is shown tapping control 812B to stash the predefined amount. The control 812A may be a cancel control rather than a view control so that the user could instruct that the stash not take place. A cancel control need not send a message to the remote processing system 104. Only a positive response to stash need send a message. The view control (a type of open control) invokes the computing device to unlock, receiving input for authentication to do so, and invokes the associated application, namely application 212A for the MyBank App GUIs, etc. This activity is not shown. Alternatively, the view control may invoke stash module 212B and present an interface to change the amount to be stashed, all without bringing up the whole application. A swipe action to the right applied to push notification 810 of FIG. 8A may reveal an open control (not shown) to open the full application 212A.

Control 812B invokes an authentication to unlock the device and automatically instruct the stash. GUI 804 shows message 814 requesting input to authenticate in the form of a finger or thumb print as configured with the operating system of computing device 102. Other methods of authentication may be used as enabled by computing device 102. Cancel control 816 is provided to receive input to cancel the swipe and stash action. An "X" control in an upper right corner may be provided to cancel. Upon receiving input to authenticate and authenticating this input, stash module 212B is invoked and the stash communication is sent—a message is communicated to remote processing system 104 to perform the order (a savings transaction) from the predefined information. GUI 806 provides confirmation (e.g. via message 818) which may be responsive to a message from the remote processing system 104 that the stash was successful. OK control 820 receives input to clear the message on the computing device 102.

FIG. 9 is a flowchart showing operations 900 of swipe and stash action. Operations may be performed by a computing device comprising a processor and, coupled to the processor, a storage device, a communication subsystem, an input device and an output device (e.g. a gesture-based display screen, etc.) The storage device stores instructions which when executed by the processor configures the operation of the computing device. At 902, even when the computing device is in a locked state where a user control of the computing device is restricted until the computing device receives user authentication to transition to an unlocked state, the computing device receives, via the communication subsystem, a push notification requesting input to initiate a performance of a task. The task may be a savings transaction. At 904, the computing device presents the push notification such as by displaying a message.

Steps 906-910 are responsive to a first input to initiate the performance—e.g. where the first input swipes left on the push notification and invokes the stash control. At 906, operations request a (second) input to authenticate the user (e.g. to unlock the computing device 102) to initiate the performance of the task, loading and invoking only stash module 212B in operating memory. Application 212A is not loaded into operating memory. At 908, operations evaluate the input authenticate to confirm authentication. At 910, in response to authentication, stash module 212B only is loaded to initiate the performance of the task. It is understood that application 212A is not executing in a background mode for example and need not be loaded into operating memory (e.g. also known as volatile memory, working memory, or execution memory) to perform the stash function.

The output device may comprise a display device and the push notification may be displayed on a graphical user interface (GUI) defining a lock screen for the computing device.

The computing device's instructions may define an application that is a financial application having access to one or more financial accounts of a user of the computing device. The task may be considered as sending a message, via the communication subsystem, to instruct an execution of a financial transaction by a remote financial system (e.g. remote processing system 104) in relation to at least one of the financial accounts.

The financial transaction may be a savings transaction and the push notification may be generated from a review of at least some of the one or more financial accounts to determine an amount available for the financial transaction.

The instructions of the application may configure the computing device to provide a transaction suggestion component (e.g. as a tutorial) operating to present one or more GUIs defining a suggestion to perform a first financial transaction, the first financial transaction determined from a review of at least some of the one or more financial accounts to determine an amount available for the first financial transaction; and send a communication, via the communication subsystem, to perform the execution of the first financial transaction by a remote financial system in response to input received. The instructions of the application may configure the computing device to provide a savings teaching tool component (e.g. as a tutorial) operating to: present one or more GUIs to teach recent spending habits determined from a review of at least some of the one or more financial accounts to track recent spending; and present one or more GUIs to teach an opportunity to save on spending. The form may be a quiz. The transaction suggestion component may further operate to define a new financial account (e.g. a "bucket") at the remote financial system with which to perform the first financial transaction. The first financial transaction may be a savings deposit and the new financial account may be a savings account.

The transaction suggestion component may further operate to: present one or more GUIs to define a pre-set amount for performing financial transactions periodically, where the one or more GUIs show a quantum of savings regularly achieved from which to define the pre-set amount and the quantum of savings are determined from tracking spending habits over a tracking period; define the pre-set amount in response to received input for the pre-set amount; and, communicate, via that communication sub-system, the pre-set amount to the remote financial system to periodically define and communicate instances of the push notification to the computing device to perform instances of the financial transaction periodically.

The storage device may store instructions defining an operating system which when executed configure the computing device to: put the computing device into the locked state; and require user authentication input to transition to the unlocked state and make available the computing device for user control.

There is described a computing device comprising a processor and, coupled to the processor, a storage device, a communication subsystem, an input device and an output device, the storage device storing instructions which when executed by the processor configure the computing device to: receive and present a push notification while in a locked state, the push notification requiring authenticated authorization to perform an order; receive and authenticate an authorization to perform the order; and load into an operating memory only a portion of an application to instruct a performance of the order without loading a remainder of the application.

FIG. 10 is a flowchart of operations 1000 of a remote processing system in accordance with an aspect herein. Operations may be performed by a computing device (or system) comprising a processor and, coupled to the processor, a storage device and a communication subsystem. The storage device stores instructions which, when executed by the processor, configure the operation of the computing device. At 1002 operations review customer information including at least some accounts of a customer to determine spending habits. At 1004 operations provide spending information to a computing device (e.g. the customer's device) to present a tutorial including a suggestion to save.

At 1006, operations optionally, receive information from the computing device to define a bucket (e.g. savings account). At 1008, operations receive communications from the computing device instructing savings to the bucket from time to time. At 1010, operations determine a savings amount from the savings to the bucket from time to time and communicate to the computing device to suggest enabling a swipe and stash function. At 1012, operations receive communication instructing enablement of the swipe and stash function, storing a trigger threshold amount saved and a stash amount. The threshold amount saved is an amount which if achieved by the customer triggers a push notification to perform an instance of the swipe and stash function at the stash amount. At 1014, operations review customer information including at least some accounts to determine what amount the customer has saved. Responsive to amount saved, if meeting the threshold, a push notification to swipe and stash the stash amount to the bucket is communicated to the computing device (step 1016). At 1018 operations receive a communication instructing the saving of the stash amount to the bucket and the savings transaction is performed.

FIGS. 11A-11D, 12A-12C, 13A-13D and 14A-14B are GUIs illustrating a second scenario of impulse savings in accordance with an aspect of the present disclosure. The GUIs are similarly illustrated relative to a display screen as the GUIs of the first scenario.

Similar to the first scenario described, a user is in a relationship with a financial institution where the remote processing system manage accounts of the user. The user has authorized the financial institution to review spending by reviewing customer information including at least some of the accounts. In the present scenario of impulse savings, via the application 212A and its GUIs, the user is asked to enable a discovery of events which may have savings needs associated with the event. Example events may be personal or business, or other types, etc. Events may be categorized (given a type) and associated automatically or with user input with saving goals (e.g. to establish a target amount to be saved). As per the first scenario, a bucket may be defined (e.g. an account and/or subaccount opened) to which the savings are sent/held by the financial institution. In this scenario, more than one user may direct savings to the bucket. The remote processing system may invite others to participate as described further. Notification may be sent to a user when another user performs a transaction with the bucket.

A swipe and stash function may be enabled so that swipe and stash instances may be defined and executed for such buckets in this scenario as well (though not shown in the GUIs). Some of the GUIs for the present scenario show graphical representation of progress toward a target. Such representations may be used for buckets established in accordance with the first scenario when a target for such a bucket is defined.

FIGS. 11A-11D show GUIs 1100, 1102, 1104, 1106 and 1108 for the enablement of a savings event discovery function. At portion 310 a suggestion is made to enable the function and a control 1110 is provided to invoke the enablement. To discover upcoming events, application 212A and/or remote processing system 104 obtains access to additional customer information/user information such as information available on or through device 102. Such information may comprise calendar information and may include (though not shown) contact information, social media information, email, SMS or other communication information to determine events of the customer. While calendar information may provide explicit event information about the future or the past, other information may provide data from which events may be inferred. For example, contact information may disclose the identity of a customer's partner or a child's/relative's name and social media information (including past information) may reveal the child's birthday, anniversary day, graduation day, etc. (or a date nearby) to use as a savings event.

Figure 11A:
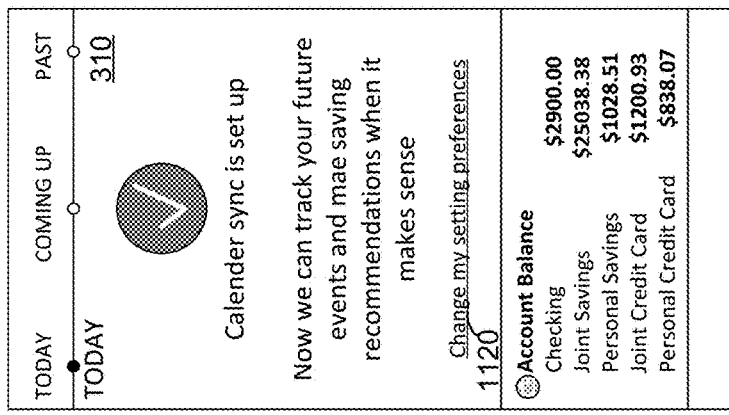
FIGS. 11A-11D, 12A-12C, 13A-13D and 14A-14B are illustrations of graphical user interfaces in accordance with an aspect of the present disclosure.
Figure 11B:
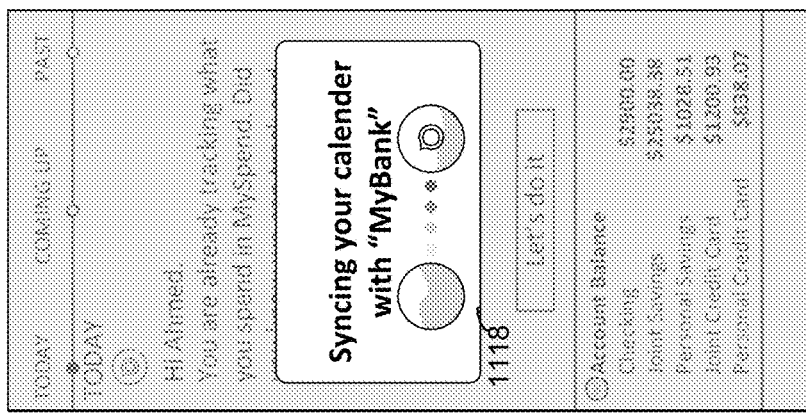
Figure 11C:
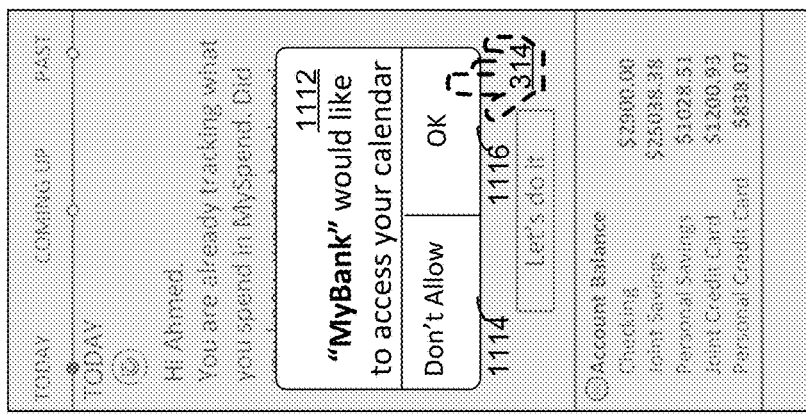
Figure 11D:
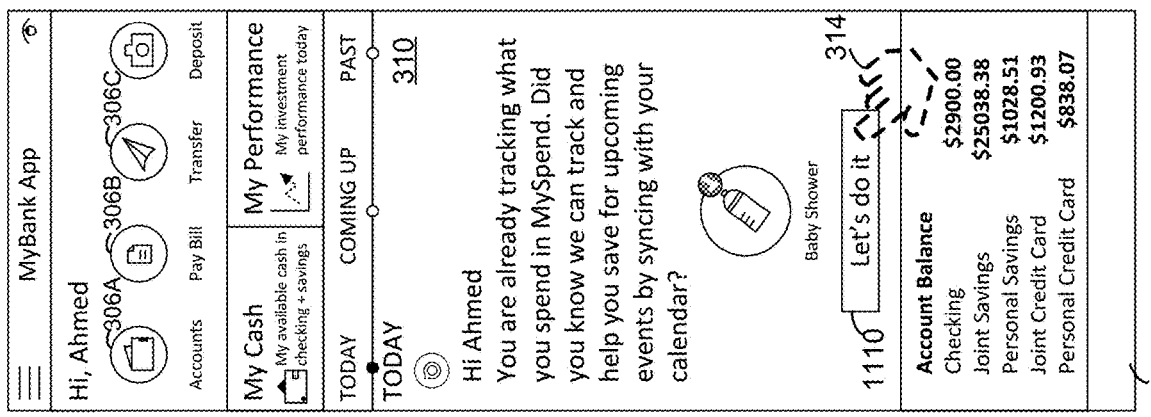

GUI 1102 of FIG. 11B shows a message 1112 with controls 1114 and 1116 to authorize access (or not) to calendar information. GUI 1104 shows message 1118 indicating a calendar sync operation is enabled and performance is progressing. The message may be dynamic and update in response to progress. A significant amount of user information may be communicated to perform the sync with remote processing system 104. GUI 1108 shows in portion 310 that syncing is complete. Preferences (e.g. calendar sync preferences stored at remote processing system 104) may be updated, etc. via control 1120.

Figure 12C:
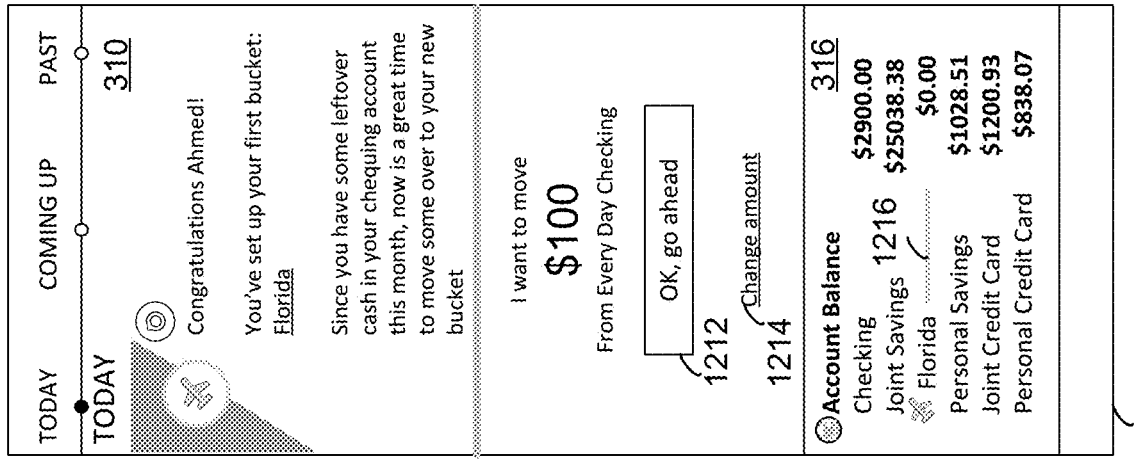
Figure 12B:
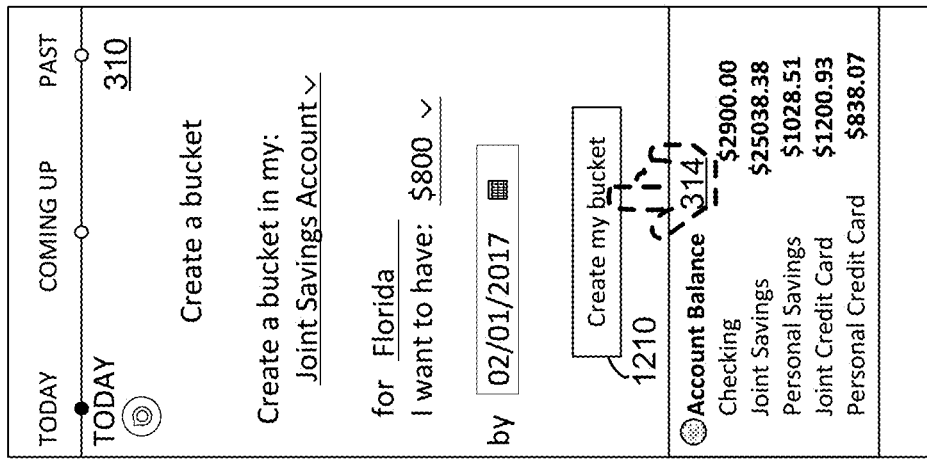
Figure 12A:
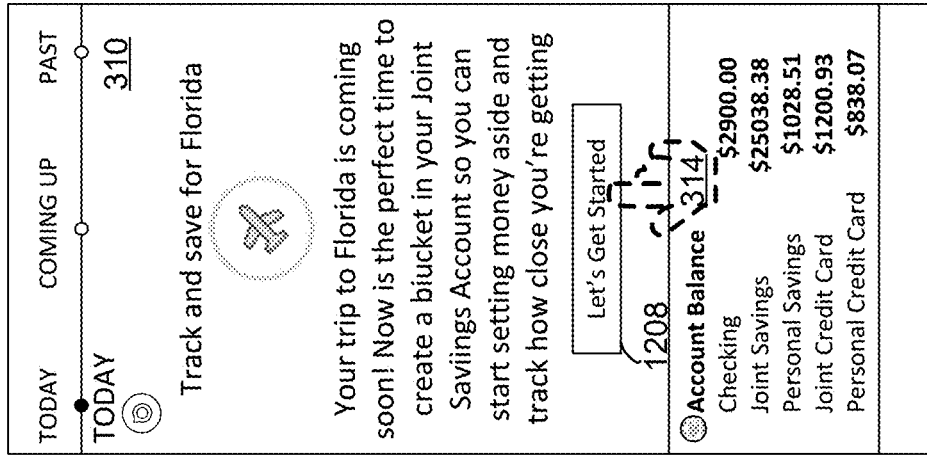
Figure 13A:
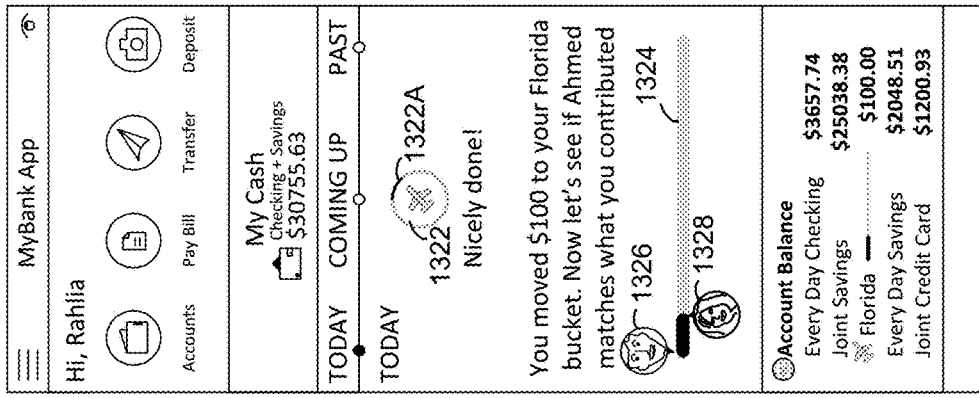
Figure 13B:
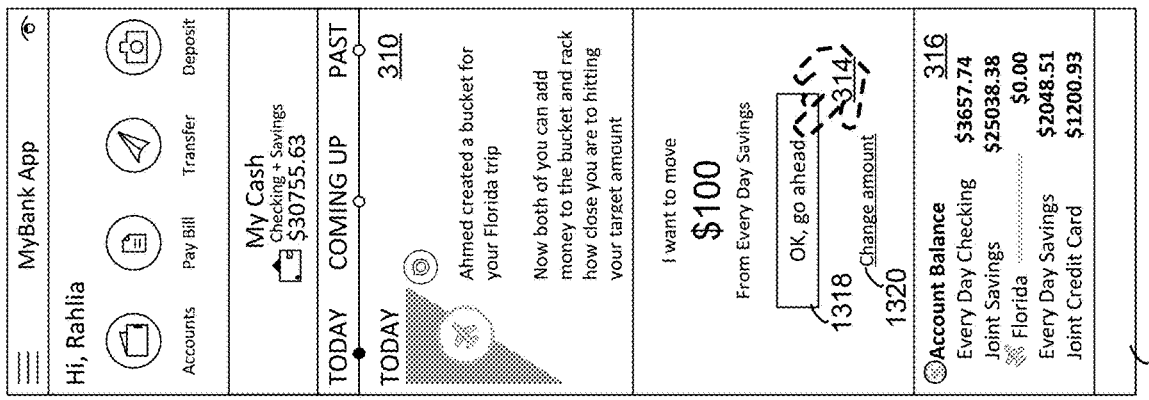
Figure 13C:
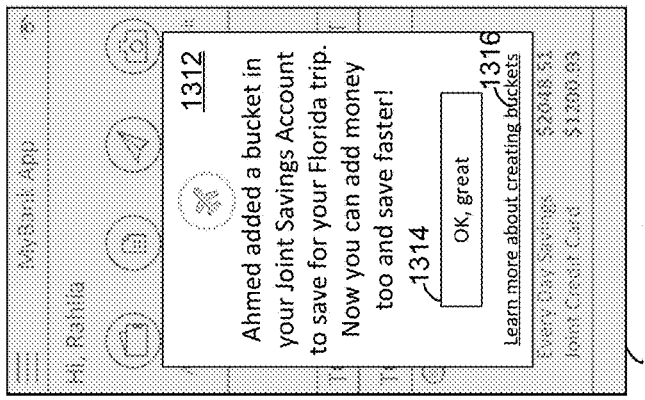
Figure 13D:
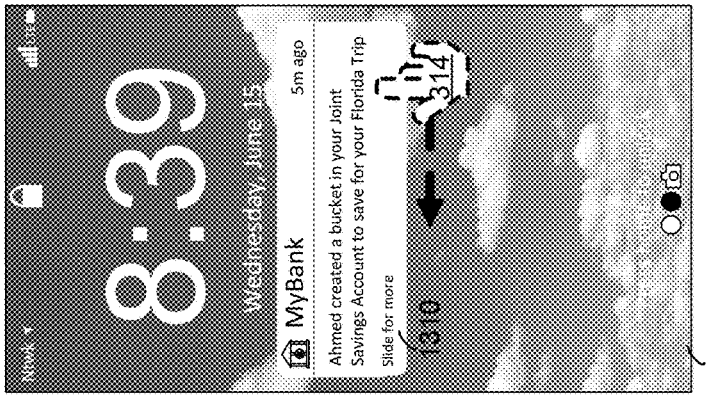

FIGS. 12A-12C show GUIs 1200, 1202 and 1204, defining a bucket in response to the identification of an event. GUI 1200 is presented in response to a review of the customer information and determination of a travel event, namely a trip to Florida. The event is recognized in a message (information) in portion 310. A control 1208 is provided to invoke the setting up of a bucket. Icons and messaging content may be tailored for different event types such as by using templates.

GUI 1202 shows an interface in portion 310 to define the bucket giving a parent account within which to define the bucket (subaccount), a name (Florida) and a target amount ($800). A target date may also be provided. This target date need not be the same as the event date as payment and preparations may need to be made before the date of the actual event that was discovered (e.g. in the calendar information, etc.). Though not shown, an interface to create the parent account may be provided, if needed. Account information, target amount information, and/or date information may be provided via direct input (e.g. typing) or via GUI elements (associated with a respective control) such as drop down lists, pickers, calendar interface, etc. as are known. Control 1210 is provided to receive input to invoke the creation of the bucket, communicating a (secure) message to remote processing system 104 to update its records. GUI 1204 shows information confirming the new bucket and suggesting a transaction to start saving. The suggestion may be responsive to a review of at least some accounts as described herein and a respective message from remote processing system 104. Control 1212 make invoke such a transaction. Control 1214 may change the suggested amount. Portion 316 shows the new bucket as a subaccount of the account labeled "Joint Savings". The account is associated with a line graph 1216 to show progress. Line graph 1216 may be updated (e.g. by a change of colour or contrasting colour, etc.) proportionately to the savings activity and relative to the target amount provided. Such preferences like target amount and date, etc. may be changed (not shown).

FIGS. 13A-13D show GUIS 1300, 1302, 1304 and 1306 of a further participant function whereby a further participant (in the present instance another customer of the financial institution) is invited to participate in the savings. The second participant (another user) may be automatically invited to participate in response to their previously established association with the parent account, for example. A joint account holder may automatically receive an invitation. In other instances (by way of alternative) the first participant setting up the account (e.g. user 116) may set a preference or other data element indicating whether to invite the second participant (user 122 of computing device 120). The first user may provide name and contact information to invite a third party (who may be an individual or entity that is not a customer of the financial institution (e.g. user 126 of computing device 124) such as by way of email, SMS or other communication.

The user (first participant) who created the bucket may have permissions relative to the bucket that are different from subsequent user's (second or subsequent participant) added to the bucket (subaccount). For example only the first participant may be permitted to withdraw funds from the bucket. In a joint account scenario, another joint account holder participating in the bucket may have identical permissions. All joint account holders may participate in a bucket associated with the joint account as such holders are equal participants. Regulatory and/or legal relationships may establish and/or determine differences/no differences, etc. in the respective permissions.

In some accounts it may be established that withdrawals require the agreement of at least two users having withdrawal rights or permission relative to the bucket. For some buckets, only the first participant may have all permissions and subsequent participants only have a right to make a deposit. Subsequent participants may have no right to withdraw and no right to review the balance.

GUI 1300 shows a push notification 1310 to a second participant (e.g. user 122 via computing device 120) indicating that a new bucket ("Florida") is established in the second user's joint saving account with the first participant (first user). Computing device 124 may be similarly configured as computing device 102 with a respective instance of application 212A. Push notification 1310 may be swiped to open the application for further information.

If the push notification is ignored (or push is not enabled), GUI 1302 shows an "in app" message 1312 to notify the second participant. A control 1314 receives input acknowledging the information and may be useful to turn off future notifications regarding the creation of this bucket (i.e. it provides user acknowledgement which can be logged to remote processing system 104). Control 1316 responsive to user input presents more information about bucket creation.

Messages for second participants in a different relationship (i.e. not a joint owner of the parent account) may not need consent/acknowledgment confirmation (all not shown).

GUI 1304 is similar to GUI 1204. Information is provided regarding the bucket in portion 310 as well as a suggestion to save (e.g. responsive to a review of accounts). Control 1318 receives input to invoke a saving transaction at the amount suggested or as changed via control 1320. Portion 316 shows the bucket, an icon consistent with the event type and the line graph progress bar. GUI 1306 shows an update to portion 310 and 316 after control 1318 is invoked such as by tapping (as illustrated by hand 314). In portion 310, a travel event icon 1322 incorporates a radial graph 1322A of progress. Portion 310 also shows a line graph 1324 of progress with avatars (first participant avatar 1326 and second participant avatar 1328) for each contributor indicating their respective contributions.

Figure 14B:
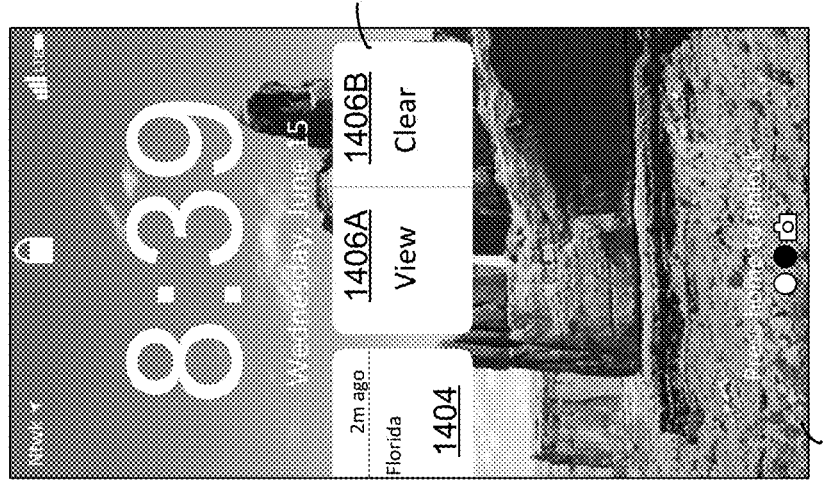
Figure 14A:
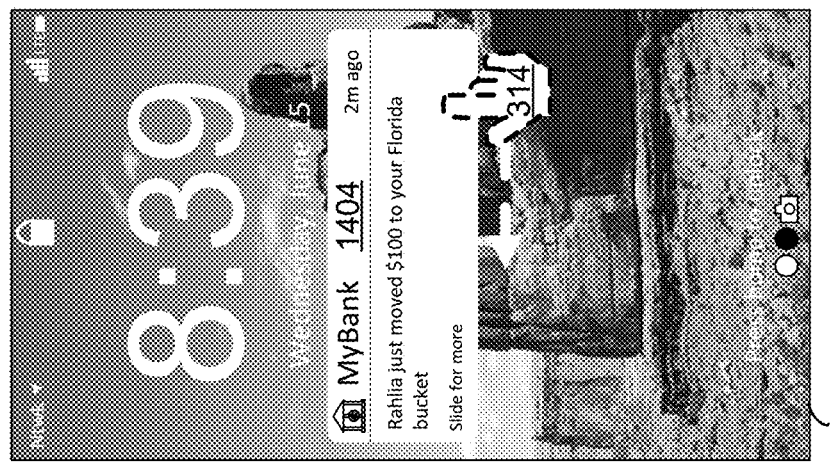

FIGS. 14A-14B show GUIs providing a user notification function whereby when one participant interacts with the bucket (e.g. a deposit or withdrawal), the other participant(s) associated with the bucket is (are) notified. For joint account buckets all joint owner participant may be provided with notification of any other participant's activity, (joint owner or not). In other cases, a primary user (e.g. a creator) is notified when a participant with lesser permissions engage in an activity). Lesser permission participant may receive no notifications of other activities. GUI 1400 shows a push notification 1404 to the first participant regarding the second participant's deposit to the bucket, inviting a swipe to see more, as illustrated by hand 314 and the dotted arrow line. GUI 1402 shows control 1406 comprising sub-control 1406A to view more (invoking application 212A after unlocking the device 102) and sub-control 1406B to clear the message. An "in app" message may be provided as an alternative.

As in the first scenario, spending habits and savings achieved (another habit) may be reviewed (monitored over a period of time) and a swipe and stash function enabled for respective users.

Thus there is disclosed, a computing device comprising a processor and, coupled to the processor, a storage device, a communication subsystem, an input device and an output device, the storage device storing instructions which when executed by the processor configure the computing device to: provide an event account creation component operating to: present one or more GUIs suggesting a creation of a financial account comprising an event account to save for an event expense; create the event account in the name of the user, communicating with a remote financial system to define the event account, the remote financial system managing one or more financial accounts for the user; and trigger the remote financial system to invite participation in the event account by another participant where participation associates the other participant with the event account in the remote financial system. The suggestion may be triggered by an identification of an event determined from user personal information of a user of the computing device, the event having the event expense.

The event account may have respective access rights for the user and the other participant. The event account may be a subaccount associated with a parent financial account, and wherein the respective access rights of the other participant in relation to the subaccount may provide no access rights in relation to the parent account. The parent financial account may be a joint account between the user and the other participant and wherein the other participant is determined automatically by reviewing information for the joint account.

The other participant may be known to the remote financial system and the other participant may be a remote banking customer authorized to use a remote banking interface having a communication channel between the remote financial system and the other participant. As such, the trigger triggers the remote financial system to invite participation through the communication channel.

The other participant may be unknown to the remote financial system and wherein the account creation component receives input identifying the other participant to receive an email, SMS or other communication to invite participation in the event account.

The instructions may configure the computing device to receive and display a notification (e.g. from the remote financial system) of activity in relation to the event account in response to activity generated by the other participant.

The instructions may configure the computing device to: enable an event discovery component operating to: present one or more GUIs requesting access to user personal information comprising at least some of calendar information; email, SMS or other communication information; and social media information associated with the user of the computing device to enable a review of the user personal information to discover the event associated with the event expense. The review may be performed by the remote financial system and the user personal information synced to the remote financial system.

The event account creation component may further operate to present one or more GUIs suggesting a first transaction to deposit a first amount to the event account from one of the one or more financial accounts for the user.

The instructions may configure the computing device to provide a transaction suggestion component operating to, from time to time: present one or more GUIs defining a suggestion to perform a deposit transaction to the event account, the deposit transaction determined from a review of at least some of the one or more financial accounts to determine a deposit amount available for the deposit transaction; and send a communication, via the communication subsystem, to perform the deposit transaction by the remote financial system in response to input received. The review may be performed by the remote financial system.

It will be understood that also disclosed are method and other aspects for the user's computing device as well as complimentary apparatus, method and other aspects for each of the remote financial system and the other participant.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a wired or wireless technologies, such are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more general purpose microprocessors, application specific integrated circuits (ASICs), field programmable logic arrays (FPGAs), digital signal processors (DSPs), or other similar integrated or discrete logic circuitry. The term "processor," as used herein may refer to any of the foregoing examples or any other suitable structure to implement the described techniques. In addition, in some aspects, the functionality described may be provided within dedicated software modules and/or hardware. Also, the techniques could be fully implemented in one or more circuits or logic elements. The techniques of this disclosure may be implemented in a wide variety of devices or apparatuses, an integrated circuit (IC) or a set of ICs (e.g., a chip set).

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. The scope of the claims should not be limited by the embodiments set forth in the examples, but should be given the broadest interpretation consistent with the description as a whole.

The invention claimed is:

1. A computing device comprising a processor and, coupled to the processor, a storage device, a communication subsystem, an input device and an output device, the storage device storing instructions which when executed by the processor configure the computing device to:
    receive input from a user to initiate the discovery of events having expense requirements associated with the events, the events determinable from one or more of calendar information, contact information, social media information, email, short message service (SMS) or other communication information;
    receive input from the user to initiate the monitoring of one or more spending accounts to determine spending information;
    display a suggestion received in response to determining first spending information, the suggestion recommending an expense saving associated with saving for one of the events;
    display a control, responsive to determining second spending information comprising an initial expense saving, to create a saving event account associated with the one of the events to perform a first savings transaction, and, thereafter, from time to time, to perform subsequent respective savings transactions, the subsequent respective savings transactions initiated via respective push notifications;
    receive input to create the account and authorize the first savings transaction;
    receive, via the communication subsystem, one of the respective push notifications requesting input to initiate performance of a task that is associated with an application defined by instructions stored on the computing device, wherein the task comprises authorizing a respective one of the subsequent respective savings transactions and transferring an amount of funds from the one or more spending accounts to the saving event account;
    when the computing device is in a locked state:
    present the one of the respective push notifications in a notification user interface having a first control to initiate performance of the task by the computing device;
    responsive to receiving input via the first control, present an authorization interface to receive authorization input to only authorize the performance of the task;
    unlock the computing device and only initiate the performance of the task by loading into an operating memory only a portion of the application without loading a remainder of the application, the portion comprising a messaging portion to communicate a message to a remote device to perform the task.

2. The computing device of claim 1 wherein the one of the respective push notifications is received when the computing device is in the locked state and wherein the notification user interface is presented over a lock screen such that control of the computing device is restricted until the computing device receives authorization to transition to an unlocked state and wherein the computing device is configured to receive and authenticate an authorization input; and, in response, transition to the unlocked state to only perform the task.

3. The computing device of claim 1, wherein the application includes a financial application having access to one or more financial accounts of a user of the computing device and the task includes sending a message, via the communication subsystem, to instruct an execution of the subsequent respective savings transactions by a remote financial system in relation to at least one of the one or more financial accounts.

4. The computing device of claim 3, wherein the push notification is generated from a review of at least some of the one or more financial accounts to determine an amount available for the subsequent respective savings transaction.

5. The computing device of claim 1, wherein the one of the respective push notifications is received in response to determining a third spending information comprising a subsequent expense saving.

6. The computing device of claim 1, wherein the instructions of the application configure the computing device to provide a savings teaching tool component to display the suggestion, the savings teaching tool component operating to:
    present one or more graphical user interfaces (GUIs) to teach recent spending habits determined from a review of spending information from at least some of the one or more financial accounts to track recent spending; and
    present one or more GUIs to teach an opportunity to save on spending.

7. A method comprising:
    receiving input from a user to initiate the discovery of events having expense requirements associated with the events, the events determinable from one or more of calendar information, contact information, social media information, email, SMS or other communication information;
    receiving input from the user to initiate the monitoring one or more spending accounts to determine spending information;

displaying a suggestion received in response to determining a first spending information, the suggestion recommending an expense saving associated with saving for one of the events;

displaying a control, responsive to determining a second spending information comprising an initial expense saving, to create a saving event account associated with the one of the events to perform a first savings transaction, and, thereafter, from time to time, to perform subsequent respective savings transactions, the subsequent respective savings transactions initiated via respective push notifications;

receiving input to create the saving event account and authorize the first savings transaction;

receiving, at the processor, one of the respective push notifications requesting input to initiate a performance of a task associated with an application defined by instructions stored on the computing device, wherein the task comprises authorizing a respective one of the subsequent respective savings transactions and transferring an amount of funds from the at least one spending account to the saving event account; and when the computing device is in a locked state:

presenting the one of the respective push notifications, via the computing device, in a notification user interface having a first control to initiate performance of the task by the computing device;

responsive to receiving input via the first control, presenting an authorization interface to receive authorization input to only authorize the performance of the task; and unlocking the computing device and only initiating the performance of the task by loading into an operating memory only a portion of the application without loading a remainder of the application, the portion comprising a messaging portion to communicate a message to a remote device to perform the task.

8. The method of claim 7 wherein the one of the respective push notifications is received when the computing device is in the locked state where wherein the notification user interface is presented over a lock screen such that control of the computing device is restricted until the computing device receives authorization to transition to an unlocked state and wherein the method comprises, in response to an authorization, transitioning to an unlocked state to only perform the task.

9. The method of claim 7, wherein the application comprises a financial application having access to one or more financial accounts of a user of the computing device; and wherein the task includes sending a message to instruct an execution of the subsequent respective savings transaction by a remote financial system in relation to at least one of the one or more financial accounts.

10. The method of claim 9, wherein the push notification is generated from a review of at least some of the one or more financial accounts to determine an amount available for the subsequent respective savings transaction.

11. The method of claim 9, wherein the one of the respective push notifications is received in response to determining a third spending information comprising a subsequent expense saving.

12. The method of claim 11 comprising providing a savings teaching tool component to display the suggestion, the savings teaching tool component operating to:

present one or more GUIs to teach recent spending habits determined from a review of at least some of the one or more financial accounts to track recent spending; and present one or more GUIs to teach an opportunity to save on spending.

13. The method of claim 11, wherein the saving event account comprises a new financial account at the remote financial system with which to perform the first savings transaction associated with the event.

14. The device of claim 1, wherein the saving event account comprises a subaccount of an existing financial account at a remote financial system, the subaccount associated to the event.

15. The device of claim 1, wherein saving event account information is shared with a third party and the saving event account is enabled to receive savings amounts from the third party.

16. The method of claim 7, wherein the saving event account comprises a subaccount of an existing financial account at a remote financial system, the subaccount associated to the event.

17. The method of claim 7, wherein saving event account information is shared with a third party and the saving event account is enabled to receive savings amounts from the third party.

18. The device of claim 6, wherein the savings teaching tool is configured to present a quiz to teach expense behaviour.

19. The method of claim 12, wherein the savings teaching tool component is configured to present a quiz to teach expense behaviour.

20. One or more non-transitory computer storage media storing instructions, which when executed by a processor of a computing device, configure the computing device to:

receive input from a user to initiate the discovery of events having expense requirements associated with the events, the events determinable from one or more of calendar information, contact information, social media information, email, SMS or other communication information;

receiving input from the user to initiate the monitoring of one or more spending accounts to determine spending information;

display a suggestion received in response to determining first spending information, the suggestion recommending an expense saving associated with saving for one of the events;

display a control, responsive to determining second spending information comprising an initial expense saving, to create a saving event account associated with the one of the events to perform a first savings transaction, and, thereafter, from time to time, to perform subsequent respective savings transactions, the subsequent respective savings transactions initiated via respective push notifications;

receive input to create the account and authorize the first savings transaction;

receive one of the respective push notifications requesting input to initiate performance of a task that is associated with an application defined by instructions stored on the computing device, wherein the task comprises authorizing a respective one of the subsequent respective savings transactions and transferring an amount of funds from the one or more spending accounts to the saving event account;

when the computing device is in a locked state:

present the one of the respective push notifications in a notification user interface having a first control to initiate performance of the task by the computing device;

responsive to receiving input via the first control, present an authorization interface to receive authorization input to only authorize the performance of the task; and unlock the computing device and only initiate the performance of the task by loading into an operating memory only a portion of the application without loading a remainder of the application, the portion comprising a messaging portion to communicate a message to a remote device to perform the task.

* * * * *